Sept. 28, 1965   W. MAYER   3,208,805
SELF-ALIGNING BEARING

Filed April 9, 1962   2 Sheets-Sheet 1

Inventor
Walter Mayer
Paul O. Pippel
Attorney

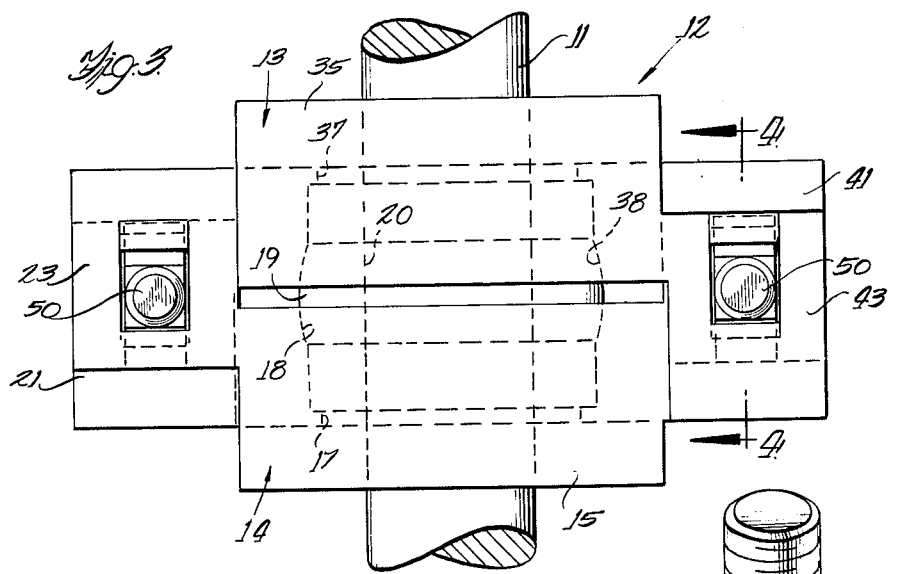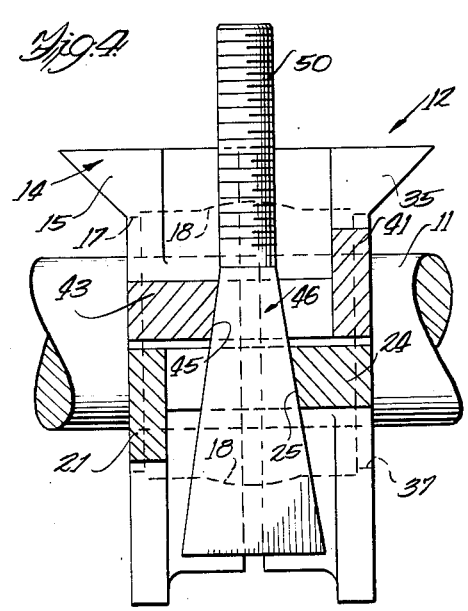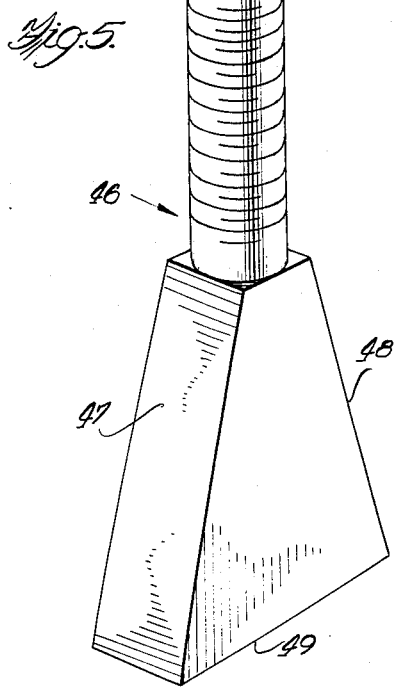

United States Patent Office 3,208,805
Patented Sept. 28, 1965

3,208,805
SELF-ALIGNING BEARING
Walter Mayer, Lodi, Calif., assignor to International Harvester Company, Chicago, Ill., a corporation of New Jersey
Filed Apr. 9, 1962, Ser. No. 186,021
1 Claim. (Cl. 308—29)

This invention relates in general to a bearing for a rotatable shaft, and more particularly to a new and improved mounting means for a self-aligning type bearing.

In the past, bearings of the self-aligning type have found great utility in applications where it was desired to allow a shaft to be capable of tilting, as well as rotational, movement with respect to a bearing housing. Such arrangements have usually consisted of a housing with a concave spherical portion, having the convex spherical outer race of a bearing seated therewithin for limited angular movement with respect thereto. Prior art devices have proven unsatisfactory in that they have subjected the bearing parts to excessive wear, and in that the bearing parts have been positioned in such a way as to be difficult to repair or replace.

An object of the present invention is the provision of mounting means for a self-aligning bearing which will firmly support the bearing without subjecting the bearing parts to excessive wear.

Another object of the invention is to provide mounting means for a self-aligning bearing which will compensate for the wearing of the parts so as to always insure a firm support for the bearing.

A further object of the invention is the provision of a readily accessible mounting means for a self-aligning bearing, which can be easily disassembled to repair or replace the bearing.

A still further object of the invention is the provision of wear-compensating means which cooperate with a supporting frame to mount a self-aligning bearing.

Other objects and advantages of the invention will hereinafter become more fully apparent from the following description of the annexed drawings, which illustrate a preferred embodiment of the invention, and wherein:

FIGURE 3 is a plan view of the apparatus illustrated in FIGURE 1;

FIGURE 4 is a sectional view taken along the line 4—4 of FIGURE 3; and

FIGURE 5 is a perspective view on an enlarged scale of the wedge bolt of the invention.

This invention has noteworthy utility in the agricultural implement field, and more particularly with a disk harrow wherein a plurality of ground working disks are mounted at spaced apart points along a shaft. Such a shaft must be capable of free rotation, and of limited angular movement to compensate for ground irregularities and obstructions which are encountered while traversing a field.

Figure 1:
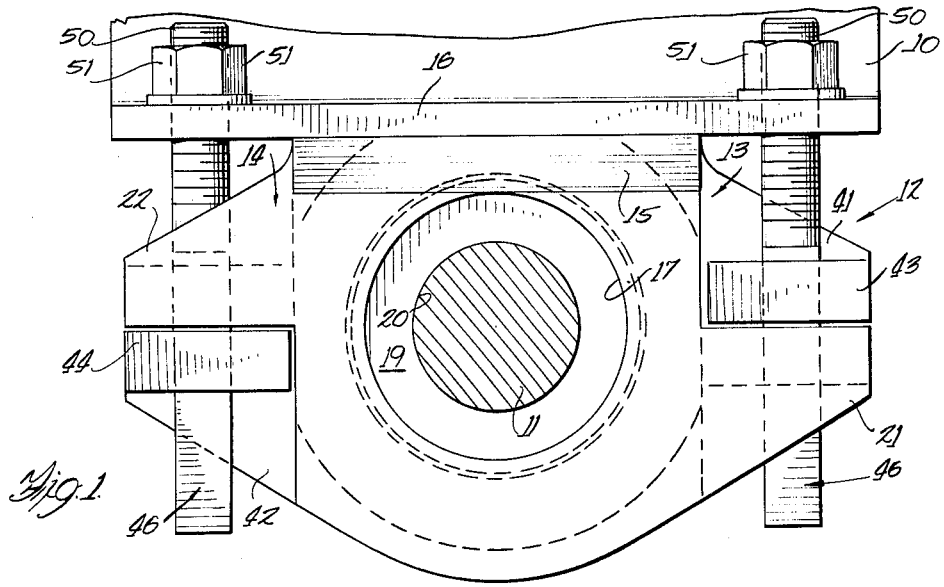
FIGURE 1 is a front elevational view, partly in section, of a preferred embodiment of the invention.
Figure 2:
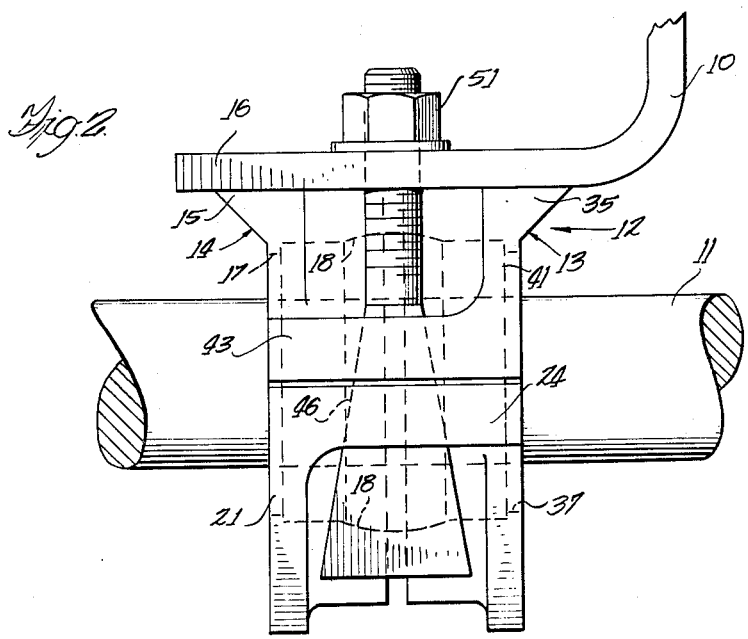
FIGURE 2 is a side elevational view of the apparatus illustrated in FIGURE 1.

Referring now to the drawings wherein like reference characters designate like or corresponding parts throughout the several views, there is shown in FIGURE 1 and FIGURE 2 a hanger 10 adapted to be secured to a frame, not shown. A shaft 11 is rotatably mounted with respect to hanger 10 by bearing mounting means indicated generally at 12. Mounting means 12 include a pair of juxtaposed similarly shaped clamps 13 and 14.

The front clamp 14, as viewed in FIGURE 1 and FIGURE 3, or the left-hand clamp, as viewed in FIGURE 2 and FIGURE 4, is provided with an outwardly projecting dovetail shaped flange 15 engageable with the mounting surface 16 of hanger 10 to provide a stable attachment of clamp 14 to the frame. Clamp 14 is provided with a transversely extending bore 17, which is adapted to receive shaft 11 therethrough. The rearward end of bore 17 is provided with a concave spherical area 18 for reception of the convex spherically shaped outer periphery of self-aligning bearing 19. Bearing 19 may be any conventional type, such as a roller or ball bearing, which has its inner race secured to shaft 11 in any well known fashion.

Clamp 14 is provided with a pair of laterally extending lugs 21 and 22. As is best seen in FIGURE 2 and FIGURE 4, lugs 21 and 22 are L-shaped in cross-section, and include ear or shelf portions 23 and 24 extending axially of shaft 11. Shelf portions 23 and 24 are provided with openings extending therethrough, each said opening having a tapered wall portion 25 disposed at an angle with respect to the axis of shaft 11. With particular reference to FIGURE 1, it will be noted that lug 22 is disposed above the center line of shaft 11, whereas lug 21 is disposed below the center line of shaft 11. The purpose of this arrangement will hereinafter become obvious.

Clamp 13 is provided with an outwardly directed dovetail shaped flange portion 35, which is engageable with the lower surface of hanger portion 16 to securely position the clamp in the desired location. Clamp 13 is provided with a bore 37 extending therethrough and communicating with bore 17 of clamp 14 to form a shaft receiving opening for shaft 11. Bore 37 is provided with a concave spherically-shaped portion 38, which cooperates with bore portion 18 to provide a seating means for the outer diameter of bearing 19.

Clamp 13 is provided with a pair of laterally extending lugs 41 and 42. Lugs 41 and 42 are substantially L-shaped in cross-section, and have shelf or ear portions 43 and 44 respectively, extending substantially axially of shaft 11. As is best seen in FIGURE 4, shelf portions 43 and 44 are provided with an opening extending therethrough, said opening having a tapered wall portion 45 extending at an angle with respect to the axis of shaft 11. From an examination of FIGURE 1 it will be noted that lug 41 is disposed above the axis of shaft 11, while lug 42 is disposed below the axis of shaft 11.

Referring now to FIGURE 5, there is shown the novel wedge bolt 46 which is used to fixedly secure mounting means 12 to the supporting frame. The lower part of wedge bolt 46 is provided with a wedge portion consisting of a generally triangularly shaped member having faces 47 and 48 disposed at an angle with respect to base 49. The upper part of wedge bolt 46 is provided with a threaded stud portion 50, which is adapted to extend through openings in hanger portion 16 and receive nuts 51 to securely fasten mounting means 12 to the frame.

The angle at which face portions 25 and 45 are disposed with respect to the axis of shaft 11 corresponds to the angle at which face portions 47 and 48 are disposed with respect to base 49. When lugs 22 and 41 are positioned in overlapping relation with respect to lugs 42 and 21 respectively, face portions 25 and 45 become aligned to define a wedge receiving channel. Thus when the wedge bolts 46 are inserted through the openings in shelves 23, 24, 43 and 44, the face portions 47 and 48 will engage face portions 25 and 45, and thereby impart a horizontal force to clamp members 13 and 14 to move them axially along shaft 11 toward one another into gripping relation with respect to bearing 19. Nuts 51 are tightened to such an extent that wedge bolt 46 forces clamps 13 and 14 into secure clamping relation with respect to bearing 19, thus providing take-up means which compensate for wear between the various parts.

It should be understood, of course, that the foregoing disclosure relates to only a preferred embodiment of the invention and that numerous modifications and alterations may be made therein without departing from the spirit and the scope of the invention as set forth in the appended claim.

What is claimed is:

Means for rotatably mounting a shaft with respect to a frame comprising, first and second clamps having concave spherically shaped bearing receiving recesses formed therein, said clamps being positioned adjacent one another, a shaft extending through said clamps, a bearing having a convex spherically shaped outer periphery positioned within said recesses and having said shaft rotatably mounted therewithin, said clamps each having at least one apertured lug portion, said lug portions being positioned in overlapping relation so as to align said apertures, and a fastener member extending through said apertures and engaging said frame to force said clamps in gripping relation with respect to said bearing and secure said clamps to said frame, said apertures being provided with tapered wall portions, and said fastener including a tapered portion engageable with said tapered wall portions to force said clamps axially along said shaft.

References Cited by the Examiner

UNITED STATES PATENTS

| 1,079,680 | 11/13 | Wintroath | 308—142 |
| 1,332,760 | 3/20 | Saitta | 287—87 X |
| 1,660,939 | 2/28 | Snow. | |
| 1,695,146 | 12/28 | Good | 308—74 X |
| 2,048,763 | 7/36 | Whiteley | 308—72 X |
| 2,114,051 | 4/38 | Freed | 308—72 |
| 2,573,532 | 10/51 | Arp | 308—72 |
| 2,652,297 | 9/53 | Stearns et al. | 308—74 X |

FOREIGN PATENTS 1,094,515   12/54   France.

OTHER REFERENCES

Germany (printed application) 1,094,515, Dec. 12, 1957 (1 sht. drg. 2 pp. spec.).

ROBERT C. RIORDON, *Primary Examiner.*

FRANK SUSKO, *Examiner.*